United States Patent
Benway et al.

(10) Patent No.: US 10,446,168 B2
(45) Date of Patent: Oct. 15, 2019

(54) NOISE LEVEL MEASUREMENT WITH MOBILE DEVICES, LOCATION SERVICES, AND ENVIRONMENTAL RESPONSE

(71) Applicant: Plantronics, Inc., Santa Cruz, CA (US)

(72) Inventors: Evan Harris Benway, Santa Cruz, CA (US); Erik Perotti, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 636 days.

(21) Appl. No.: 14/243,814

(22) Filed: Apr. 2, 2014

(65) Prior Publication Data

US 2015/0287421 A1  Oct. 8, 2015

(51) Int. Cl.
| | | |
|---|---|---|
| G10L 25/78 | (2013.01) | |
| G10L 21/0208 | (2013.01) | |
| H04R 1/10 | (2006.01) | |
| G01H 3/12 | (2006.01) | |
| G10K 11/175 | (2006.01) | |
| H04K 3/00 | (2006.01) | |

(52) U.S. Cl.
CPC ......... *G10L 21/0208* (2013.01); *G01H 3/125* (2013.01); *G10K 11/175* (2013.01); *H04K 3/43* (2013.01); *H04K 3/45* (2013.01); *H04K 3/825* (2013.01); *H04R 1/1083* (2013.01); *G10K 2210/12* (2013.01); *H04K 2203/12* (2013.01); *H04R 2499/11* (2013.01)

(58) Field of Classification Search
CPC ........... G10L 25/78; G10L 2021/02166; G10L 25/60; G10L 25/84
USPC ........................................................ 704/226
See application file for complete search history.

(56) References Cited

U.S. PATENT DOCUMENTS

| | | | |
|---|---|---|---|
| 7,916,848 B2 * | 3/2011 | Rui .................. | H04L 29/06027 379/202.01 |
| 8,335,312 B2 | 12/2012 | Gerhardt et al. | |
| 8,681,203 B1 * | 3/2014 | Yin ......................... | H04N 7/15 348/14.08 |
| 9,183,845 B1 * | 11/2015 | Gopalakrishnan .......................... | G10L 21/0208 |

(Continued)

FOREIGN PATENT DOCUMENTS

| | | |
|---|---|---|
| EP | 2755003 A1 | 7/2014 |
| WO | WO 2011/050401 A1 | 5/2011 |

OTHER PUBLICATIONS

Invitation to Pay Additional Fees and, Where Applicable, Protest Fee and Partial Search Report dated Aug. 19, 2015, for PCT Application No. PCT/US2015/024163.

(Continued)

*Primary Examiner* — Jakieda R Jackson
(74) *Attorney, Agent, or Firm* — Chuang Intellectual Property Law

(57) ABSTRACT

Methods and apparatuses for noise management are disclosed. In one example, a method includes receiving a plurality of noise level measurements taken at a plurality of headsets. The method includes receiving a plurality of location data, including receiving a location data associated with each headset in the plurality of headsets. In one example, the method further includes adjusting an environmental parameter utilizing the noise level measurements. In one example, the method further includes providing location services to a user directing the user to a geographical area having a lower noise level.

17 Claims, 10 Drawing Sheets

(56) References Cited

U.S. PATENT DOCUMENTS

| | | | | |
|---|---|---|---|---|
| 2004/0252846 A1* | 12/2004 | Nonaka | ............ | G10K 11/1788 381/71.4 |
| 2006/0009969 A1* | 1/2006 | L'Esperance | ........ | G10K 11/175 704/226 |
| 2007/0053527 A1* | 3/2007 | Barbieri | ................ | H04M 1/60 381/104 |
| 2007/0179721 A1* | 8/2007 | Yaney | ................ | H04B 1/1027 702/59 |
| 2008/0159547 A1 | 7/2008 | Schuler et al. | | |
| 2010/0135502 A1 | 6/2010 | Keady et al. | | |
| 2010/0172510 A1 | 7/2010 | Juvonen | | |
| 2011/0257967 A1* | 10/2011 | Every | ................ | G10L 21/0208 704/226 |
| 2011/0307253 A1* | 12/2011 | Lloyd | .................... | G10L 15/20 704/233 |
| 2012/0143431 A1* | 6/2012 | Kim | .................. | G05B 23/0216 701/29.1 |
| 2012/0226997 A1* | 9/2012 | Pang | .................. | H04L 65/4038 715/753 |
| 2012/0316869 A1 | 12/2012 | Xiang et al. | | |
| 2013/0030803 A1* | 1/2013 | Liao | ........................ | G10L 15/20 704/233 |
| 2013/0080018 A1* | 3/2013 | Baek | .................... | B60W 30/16 701/96 |
| 2013/0321156 A1* | 12/2013 | Liu | .................... | H04M 1/6008 340/573.1 |
| 2014/0072143 A1* | 3/2014 | Liu | ........................ | H03G 3/345 381/94.5 |
| 2014/0247319 A1* | 9/2014 | Anderson | ................ | H04N 7/15 348/14.08 |
| 2014/0324434 A1* | 10/2014 | Vozila | .................... | G10L 15/18 704/257 |
| 2015/0002611 A1* | 1/2015 | Thapliyal | ............ | H04L 12/1827 348/14.08 |
| 2015/0156598 A1* | 6/2015 | Sun | .................... | H04L 12/1822 348/14.07 |
| 2015/0179186 A1* | 6/2015 | Swierk | .................... | G10L 25/60 704/276 |

OTHER PUBLICATIONS

International Search Report and Written Opinion of the International Searching Authority dated Oct. 27, 2015, for PCT Application No. PCT/US2015/024163.

Benway et al., "Speech Intelligibility Measurement and Open Space Noise Masking," Utility U.S. Appl. No. 14/188,200, filed Feb. 24, 2014, 36 pages.

Elsbach et al., "It's More than a Desk: Working Smarter Through Leveraged Office Design," California Management Review 49(2):80-101, Winter 2007.

Benway et al., "Masking Open Space Noise using Sound and Corresponding Visual," Utility U.S. Appl. No. 14/136,372, filed Dec. 20, 2013.

Unknown, "Gensler 2013 U.S. Workplace Survey / Key Findings," Gensler, Jul. 15, 2013, found at URL <http://www.genslercom/uploads/documents/2013_US_Workplace_Survey_07_15_2013.pdf>.

* cited by examiner

Mobile Device Data 20

| Unique Identifier 302 | Noise Level (dB) 304 | Location 306 |
|---|---|---|
| Unique ID 1 | Noise Level 1 | Location 1 |
| Unique ID 2 | Noise Level 2 | Location 2 |
| Unique ID 3 | Noise Level 3 | Location 3 |
| Unique ID 4 | Noise Level 4 | Location 4 |
| . | . | . |
| . | . | . |
| . | . | . |

FIG. 3

NOISE LEVEL MEASUREMENT WITH MOBILE DEVICES, LOCATION SERVICES, AND ENVIRONMENTAL RESPONSE

BACKGROUND OF THE INVENTION

As real estate utilization increases and offices become more densely packed, speech noise is becoming an increasingly challenging problem. Intelligible speech decreases productivity, speech privacy, and comfort.

There is a need for quiet in the workplace. According to research by Gensler, American knowledge workers spend 54% of their workweek focusing—as compared to collaborating (24%), learning (5%), socializing (8%), or other (9%). When focusing, 53% of employees are disturbed by others, with speech noise being the top distraction. Speech noise does not occur uniformly throughout an office, but rather differentially with respect to time and location.

Sound masking—the introduction of constant background noise in order to reduce speech intelligibility, increase speech privacy, and increase acoustical comfort—is increasingly incorporated into offices as a solution. Sound masking typically relies on filtered pink noise played by speakers in the ceiling plenum.

One problem in designing an optimal sound masking system relates to setting the proper masking levels. Sound masking levels are set during installation and can be adjusted at a later time. Typically, the levels are set equally on all speakers but levels may be adjusted to account for environmental variations or personal preferences. In either case, levels are typically set during installation and then never, or only infrequently, adjusted. The problem with this is that office noise fluctuates over time and by location, and different masking levels are required for different areas and at different times. An acoustical consultant installing a sound masking system outside of normal working hours is unlikely to properly address this problem and the masking levels will therefore be sub-optimal.

Solutions to employees' need for quiet range from acoustic design (absorptive paneling and carpets, high cubicle walls, sound masking, etc.) to the creation of focus rooms and enforcement of quiet policies. However, these solutions are often inadequate to provide the necessary desired quiet.

As a result, improved methods and apparatuses for noise management are needed.

BRIEF DESCRIPTION OF THE DRAWINGS

The present invention will be readily understood by the following detailed description in conjunction with the accompanying drawings, wherein like reference numerals designate like structural elements.

FIG. 3 illustrates mobile device data in one example.

DESCRIPTION OF SPECIFIC EMBODIMENTS

Figure 1:
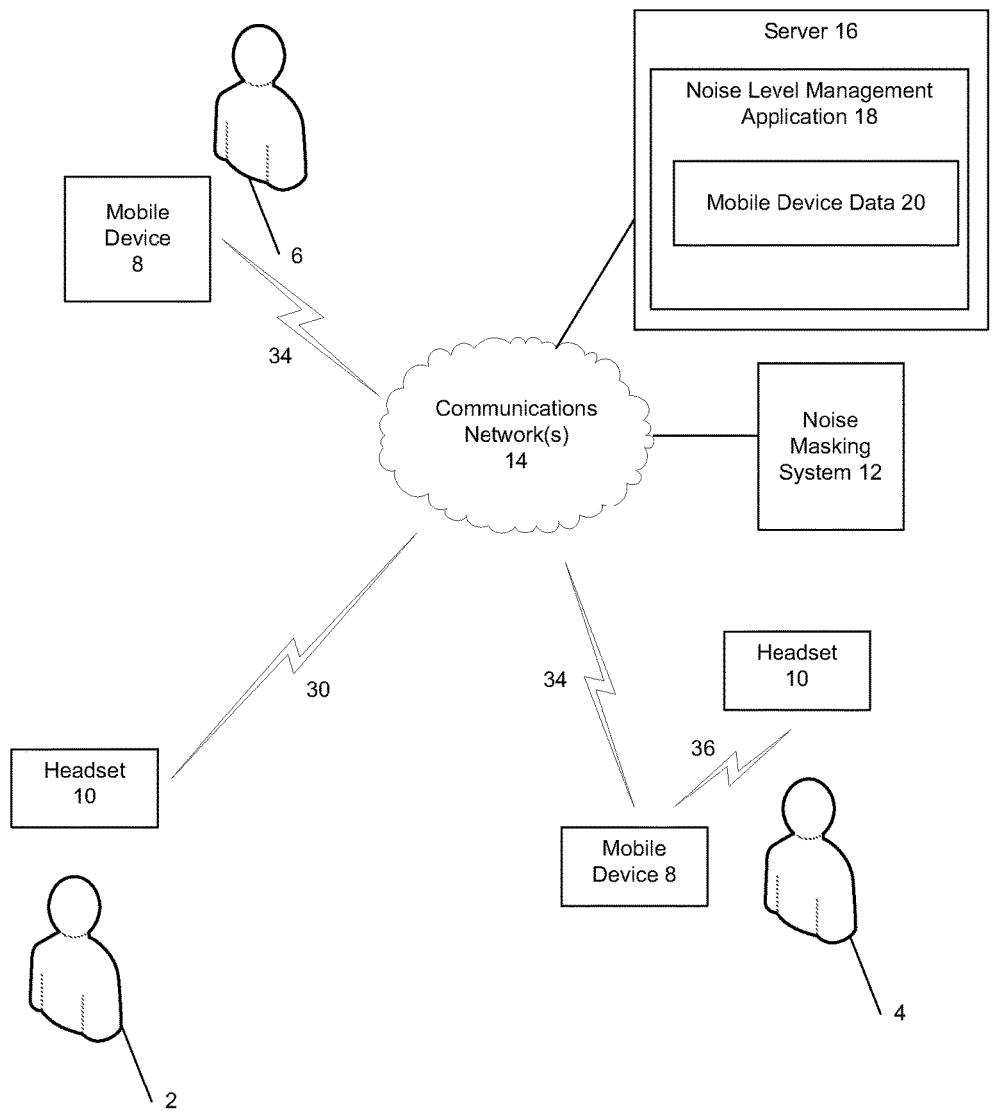
FIG. 1 illustrates a system for noise level management in one example.

Methods and apparatuses for noise management are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein.

Block diagrams of example systems are illustrated and described for purposes of explanation. The functionality that is described as being performed by a single system component may be performed by multiple components. Similarly, a single component may be configured to perform functionality that is described as being performed by multiple components. For purpose of clarity, details relating to technical material that is known in the technical fields related to the invention have not been described in detail so as not to unnecessarily obscure the present invention. It is to be understood that various example of the invention, although different, are not necessarily mutually exclusive. Thus, a particular feature, characteristic, or structure described in one example embodiment may be included within other embodiments unless otherwise noted.

In one example, a method includes receiving a plurality of noise level measurements taken at a plurality of headsets, including receiving a noise level measurement for each headset in the plurality of headsets. The method includes receiving a plurality of location data, comprising receiving a location data associated with each headset in the plurality of headsets, and generating a map based upon the plurality of noise level measurements and the plurality of location data. The method further includes adjusting an environmental parameter utilizing the noise level measurements.

In one example, a method includes receiving a plurality of noise level measurements taken at a plurality of mobile devices, including receiving a noise level measurement for each mobile device in the plurality of mobile devices. The method includes receiving a plurality of location data, comprising receiving a location data associated with each mobile device in the plurality of mobile devices. The method further includes identifying a geographical area having a higher noise level and a geographical area having a lower noise level.

In one example, a system includes a plurality of mobile devices, a noise masking system, and a computing device. The computing device includes a processor, and a memory storing an application program executable by the processor. The application program includes instructions to receive noise level measurements taken at the plurality of mobile devices and adjust a sound masking volume level output from the noise masking system.

In one example of the invention, a headset is utilized to report wearer speech level information to a server, which then analyzes that information in order to: (1) Create workplace "heat maps" showing volumes of headset usage throughout the environment, (2) Identify "hot spots" and "quiet zones" based on headset levels, (3) Provide location services to the user in order to direct the user to the location of a "hot spot" or "quiet zone", and (4) Make environmental changes in response to headset volume information. Use of a headset in one example is particularly advantageous for noise reporting and use in sound masking system applications. Relative to measuring noise levels at ceiling level, the use of a headset advantageously allows for reading noise levels at head level to more accurately report noise levels due to disruptive human speech. As such, noise masking levels can be adjusted more accurately. In a further example, another type of wearable device is utilized, such as a wrist worn bracelet or watch form factor. Advantageously, the methods and systems described herein create value for end users by enabling individuals to mitigate the effects of noise, including disruptive speech noise.

The headset measures speech level in decibels (dB) and reports that information, in addition to a unique identifier, to the server in one or more of the following ways: (1) Bluetooth/DECT/Wi-Fi connection to a phone, laptop, tablet, or other host device that relays the information to the server, (2) Bluetooth/DECT/Wi-Fi connection to a sound masking device that relays the information to the server, or (3) Direct connection to the server via Wi-Fi network connection.

In one example, when donned (i.e., worn on the user ear), the headset begins measuring the speech level of the wearer in dB using the headset microphone. In another embodiment, the headset randomly measures speech level in dB, or does it at specified times, but does so only when the headset is donned. The speech level in dB and unique ID are transmitted via one of the methods described above to the server. At that time, location information is also provided using GPS coordinates in the headset or host device, or triangulated using Wi-Fi access points.

Once this information is received by the server, application logic is used to produce "heat maps"—statistical and graphical representations of headset usage throughout the environment. The "heat maps" display volume information received from donned headsets, including graphical representations of volume levels.

In one example, methods and systems are provided to help workers find productive places to work. The collection of speech levels in dB combined with location information is processed on the server by an application that creates statistical and graphical representations of "hot spots"— where headset noise levels are high—and "quiet zones"— where headset noise levels are low. High and low noise levels can be displayed in terms of absolute level in dB in order to identify loud and quiet individuals. The zones can also be displayed in terms of cumulative dB of all headsets in the surrounding area (noise "density"), in order to determine zones that are particularly loud or quiet. These zones can be displayed in real time or using time-weighted averages. The former will enable individuals to find the quietest or loudest zone at that present time, and the time weighted average can be useful in noise prediction.

In one example, in addition to locating hot spots and quiet zones on a map, the invention acts as an indoor positioning system capable of directing the user to the hot spot or quiet zone (or any other location) that the user would like to find. The invention uses the existing Wi-Fi infrastructure to provide "anchors" or "nodes," which either actively locate devices or provide environmental context for devices to sense. In another embodiment, the invention does not rely on the existing Wi-Fi infrastructure, but rather supplants or supplements the existing infrastructure using wireless capabilities built into the sound masking speakers themselves. The device used can be a computer, tablet, or smartphone, or a wearable device such as a headset.

In one example, in response to headset speech level reporting, the system makes changes to the physical environment. One such change is to increase or reduce the volume of the sound masking in order to maintain an optimal masking level, even as speech noise levels change. Another such change is to modify the masking sound source—for example, from a filtered pink noise to the sound of running water—in response to volume or noise density information.

Another such change is to modify the masking sound spectrum—for example, from a filtered pink noise to a noise that is closer to brown noise—in response to volume or noise density information. Another such change is to modify the flow rate of an office water feature, if one is installed as part of a masking system as described herein.

Another such change is to increase or decrease the lighting level, or to change the color of ambient lighting. The Color Marketing Group of Alexandria, Va., for example, describes that "yellow is happy and energetic," orange "connotes informality and playfulness," blues lower blood pressure and pulse rates," and pink acts as a tranquilizer." Changes to light level and spectrum work hand-in-hand with a sound masking system to help manage speech noise levels.

FIG. 1 illustrates a system for noise level management in one example. The system includes a headset 10 in proximity to a user 2, a mobile device 8 in proximity to a user 6, and a mobile device 8 and headset 10 in proximity to a user 4. The system also includes a server 16 capable of communications with these devices via one or more communication network(s) 14. User 4 may utilize the headset 10 with the mobile device 8 over wireless link 36 to transmit noise level measurements made at headset 10. For example, communication network(s) 14 may include an Internet Protocol (IP) network, cellular communications network, public switched telephone network, IEEE 802.11 wireless network, Bluetooth network, or any combination thereof. In the example shown in FIG. 1, the system includes a noise masking system 12.

Mobile device 8 may, for example, be any mobile computing device, including without limitation a mobile phone, laptop, PDA, headset, tablet computer, or smartphone. In a further example, mobile device 8 may be any device worn on a user body, including a bracelet, wristwatch, etc.

Mobile devices 8 are capable of communication with server 16 via communication network(s) 14 over network connections 34. Network connections 34 may be a wired connection or wireless connection. In one example, network connection 34 is a wired or wireless connection to the Internet to access server 16. For example, mobile device 8 includes a wireless transceiver to connect to an IP network via a wireless Access Point utilizing an IEEE 802.11 communications protocol. In one example, network connections 34 are wireless cellular communications links. Similarly, headset 10 at user 2 is capable of communication with server 16 via communication network(s) 14 over network connection 30.

Server 16 includes a noise level management application 18 interfacing with one or more of mobile devices 8 and headsets 10 to receive noise level measurements from and provide location services to users 2, 4, and 6. In one example, noise level management application 18 stores mobile device data 20 received from mobile devices 8 and headsets 10.

In one example, the noise level management application 18 is configured to receive noise level measurements taken at the plurality of mobile devices (e.g., mobile devices 8 and headsets 10) and adjust a sound masking volume level output from the noise masking system 12.

In one example, the noise level management application 18 is configured to adjust a sound masking sound type output from the noise masking system 12 from a first masking sound type to a second masking sound type. For example, the noise masking sound type is adjusted from a filtered pink noise to the sound of running water. In one example, the noise level management application 18 is configured to modify the masking sound spectrum—for example, from a filtered pink noise to a noise that is closer to brown noise.

In one example, the noise level management application 18 is configured to receive from the plurality of mobile devices a location data associated with each mobile device in the plurality of mobile devices. The noise level management application 18 generates a map based upon the noise level measurements and the location data associated with the plurality of mobile devices. In one example, the noise level management application 18 provides location services to a user (e.g., user 2, user 4, or user 6) directing the user to a geographical area having a higher noise level or a geographical area having a lower noise level.

In one example operation, mobile devices (i.e., mobile devices 8 and headsets 10) and server 16 perform operations including receiving a plurality of noise level measurements taken at a plurality of mobile devices. The operations include receiving a plurality of location data, including receiving a location data associated with each mobile device, and generating a map based upon the plurality of noise level measurements and the plurality of location data. The operations further include adjusting an environmental parameter utilizing the noise level measurements. In one example, the noise level measurement is a headset wearer speech level during a telephone call.

In one example, the operations further include identifying a geographical area having a higher noise level and a geographical area having a lower noise level. Location services are provided to a user directing the user to the geographical area having a higher noise level or the geographical area having a lower noise level. In one example, the operations further include receiving a unique identifier associated with each noise level measurement and each location data. For example, the unique identifier may be a device serial number. In one example, for headsets 10, the operations further include detecting a headset worn state of a headset, measuring a noise level at a headset microphone of the headset, and transmitting the noise level measurement from the headset to a remote computing device (e.g., to server 16 directly or via a mobile device 8).

In one example, adjusting the environmental parameter utilizing the noise level measurements includes adjusting a sound masking volume level output by noise masking system 12. In a further example, adjusting the environmental parameter utilizing the noise level measurements includes adjusting a sound masking sound type from a first masking sound type to a second masking sound type. In yet another example, adjusting the environmental parameter utilizing the noise level measurements includes adjusting a lighting level or a lighting color. In various examples, the environmental parameter adjusted may be anything which mitigates the effects of noise. Further examples of environmental parameters which may be adjusted include adjusting an air conditioning output level, turning computer screens on/off, etc.

Figure 2:
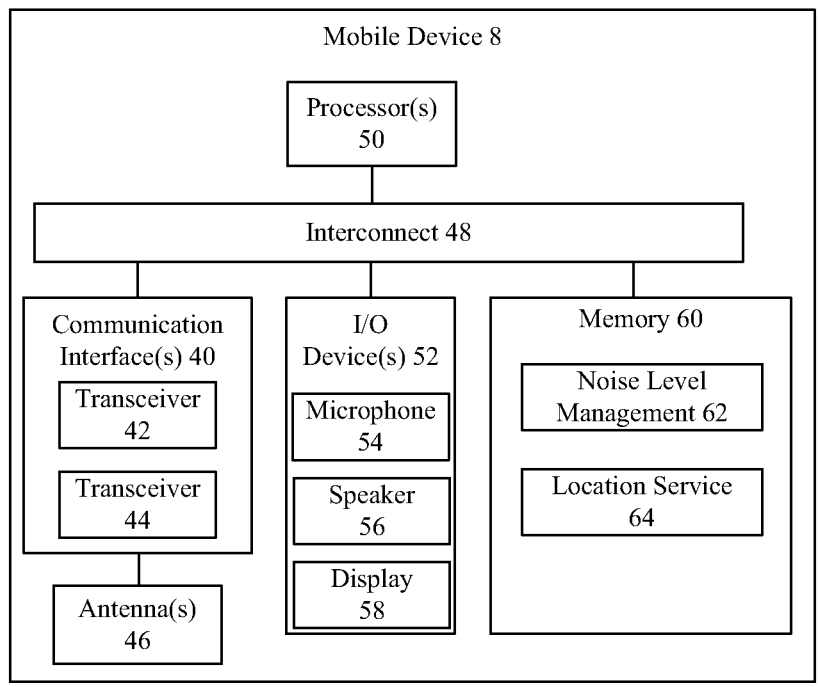
FIG. 2 illustrates a simplified block diagram of devices shown in FIG. 1.
Figure 2:
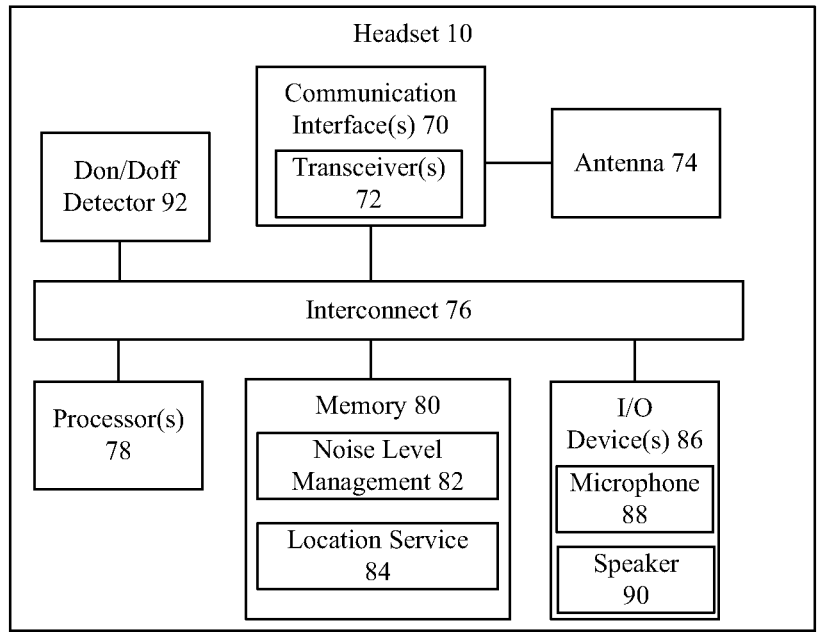

FIG. 2 illustrates a simplified block diagram of the mobile device 8 and headset 10 shown in FIG. 1. In one example, the mobile device 8 and the headset 10 each include a two-way RF communication device having data communication capabilities. The mobile device 8 and headset 10 may have the capability to communicate with other computer systems via a local or wide area network.

Mobile device 8 includes input/output (I/O) device(s) 52 configured to interface with the user, including a microphone 54 operable to receive a user voice input or other audio, a speaker 56, and a display device 58. I/O device(s) 52 may also include additional input devices, such as a keyboard, touch screen, etc., and additional output devices. In some embodiments, I/O device(s) 52 may include one or more of a liquid crystal display (LCD), an alphanumeric input device, such as a keyboard, and/or a cursor control device.

The mobile device 8 includes a processor 50 configured to execute code stored in a memory 60. Processor 50 executes a noise level management application 62 and a location service module 64 to perform functions described herein. Although shown as separate applications, noise level management application 62 and location service module 64 may be integrated into a single application.

Utilizing noise level management application 62, mobile device 8 is operable to receive noise level measurements, including speech levels, made at headset 10. Noise level management application 62 is operable to measure noise levels at mobile device 8 utilizing microphone 54.

In operation, mobile device 8 utilizes location service module 64 to determine the present location of mobile device 8 for reporting to server 16 together with noise level measurements. In one example, mobile device 8 is a mobile device utilizing the Android operating system and the headset 10 is a wireless headset. The location service module 64 utilizes location services offered by the Android device (GPS, WiFi, and cellular network) to determine and log the location of the mobile device 8 and in turn the connected headset 10, which is deemed to have the same location as the mobile device when connected. In further examples, one or more of GPS, WiFi, or cellular network may be utilized to determine location. The GPS may be capable of determining the location of mobile device 8 to within a few inches.

While only a single processor 50 is shown, mobile device 8 may include multiple processors and/or co-processors, or one or more processors having multiple cores. The processor 50 and memory 60 may be provided on a single application-specific integrated circuit, or the processor 50 and the memory 60 may be provided in separate integrated circuits or other circuits configured to provide functionality for executing program instructions and storing program instructions and other data, respectively. Memory 60 also may be used to store temporary variables or other intermediate information during execution of instructions by processor 50.

Memory 60 may include both volatile and non-volatile memory such as random access memory (RAM) and read-only memory (ROM). Device event data for mobile device 8 and headset 10 may be stored in memory 60, including noise level measurements and location data for mobile device 8 and/or headset 10. For example, this data may include time and date data, and location data for each noise level measurement.

Mobile device 8 includes communication interface(s) 40, one or more of which may utilize antenna(s) 46. The communications interface(s) 40 may also include other processing means, such as a digital signal processor and local oscillators. Communication interface(s) 40 include a transceiver 42 and a transceiver 44. In one example, communications interface(s) 40 include one or more short-range wireless communications subsystems which provide communication between mobile device 8 and different systems or devices. For example, transceiver 44 may be a short-range wireless communication subsystem operable to communicate with headset 10 using a personal area network or local area network. The short-range communications subsystem may include an infrared device and associated circuit components for short-range communication, a near field communications (NFC) subsystem, a Bluetooth subsystem including a transceiver, or an IEEE 802.11 (WiFi) subsystem in various non-limiting examples.

In one example, transceiver 42 is a long range wireless communications subsystem, such as a cellular communications subsystem. Transceiver 42 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Interconnect 48 may communicate information between the various components of mobile device 8. Instructions may be provided to memory 60 from a storage device, such as a magnetic device, read-only memory, via a remote connection (e.g., over a network via communication interface(s) 40) that may be either wireless or wired providing access to one or more electronically accessible media. In alternative examples, hard-wired circuitry may be used in place of or in combination with software instructions, and execution of sequences of instructions is not limited to any specific combination of hardware circuitry and software instructions.

Mobile device 8 may include operating system code and specific applications code, which may be stored in non-volatile memory. For example the code may include drivers for the mobile device 8 and code for managing the drivers and a protocol stack for communicating with the communications interface(s) 40 which may include a receiver and a transmitter and is connected to antenna(s) 46. Communication interface(s) 40 provides a wireless interface for communication with headset 10.

Similarly, headset 10 includes communication interface(s) 70, antenna 74, memory 80, and I/O device(s) 86 substantially similar to that described above for mobile device 8. Input/output (I/O) device(s) 86 are configured to interface with the user, and include a microphone 88 operable to receive a user voice input and a speaker 90 to output audio.

The headset 10 includes an interconnect 76 to transfer data and a processor 78 is coupled to interconnect 76 to process data. The processor 78 may execute a number of applications that control basic operations, such as data and voice communications via the communication interface(s) 70. Communication interface(s) 70 include wireless transceiver(s) 72 operable to communication with a communication interface(s) 40 at mobile device 8. The block diagrams shown for mobile device 8 and headset 10 do not necessarily show how the different component blocks are physically arranged on mobile device 8 or headset 10. For example, transceivers 42, 44, and 72 may be separated into transmitters and receivers.

The communications interface(s) 70 may also include other processing means, such as a digital signal processor and local oscillators. Communication interface(s) 70 include one or more transceiver(s) 72. In one example, communications interface(s) 70 include one or more short-range wireless communications subsystems which provide communication between headset 10 and different systems or devices. For example, transceiver(s) 72 may be a short-range wireless communication subsystem operable to communicate with mobile device 8 using a personal area network or local area network. The short-range communications subsystem may include one or more of: an infrared device and associated circuit components for short-range communication, a near field communications (NFC) subsystem, a Bluetooth subsystem including a transceiver, or an IEEE 802.11 (WiFi) subsystem in various non-limiting examples.

Headset 10 includes a don/doff detector 92 capable of detecting whether headset 10 is being worn on the user ear, including whether the user has shifted the headset from a not worn (i.e., doffed) state to a worn (i.e., donned) state. When headset 10 is properly worn, several surfaces of the headset touch or are in operable contact with the user. These touch/contact points are monitored and used to determine the donned or doffed state of the headset. In various examples, Don/Doff detector 92 may operate based on motion detection, temperature detection, or capacitance detection. For example, don/doff detector 92 is a capacitive sensor configured to detect whether it is in contact with user skin based on a measured capacitance. Further discussion regarding the use of sensors or detectors to detect a donned or doffed state can be found in the commonly assigned and co-pending U.S. patent application entitled "Donned and Doffed Headset State Detection", which was filed on Oct. 2, 2006, and which is hereby incorporated into this disclosure by reference.

The headset 10 includes a processor 78 configured to execute code stored in a memory 80. Processor 78 executes a noise level management application 82 and a location service module 84 to perform functions described herein. Although shown as separate applications, noise level management application 82 and location service module 84 may be integrated into a single application.

Utilizing noise level management application 82, headset 10 is operable to measure noise levels at headset 10 utilizing microphone 88. Noise level management application 82 transmits the measured noise levels to server 16 directly or via mobile device 8, depending upon the current connectivity mode of headset 10 to either communication network(s) directly via connection 30 or to mobile device 8 via link 36, as shown in FIG. 1.

In one example operation, headset 10 utilizes location service module 84 to determine the present location of headset 10 for reporting to server 16 together with noise level measurements. For example, where headset 10 connects to communication network(s) 14 via WiFi, the location service module 84 utilizes WiFi triangulation methods to determine the location of headset 10.

FIG. 3 illustrates mobile device data 20 in one example. Mobile device data 20 may be stored in a table including unique identifiers 302, measured noise levels 304, and locations 306. For each user device unique identifier (e.g., a headset or mobile device serial number, user ID, MAC address), the measured noise level at the device and the location of the device is recorded for use by noise level management application 18 as described herein.

Figure 4:
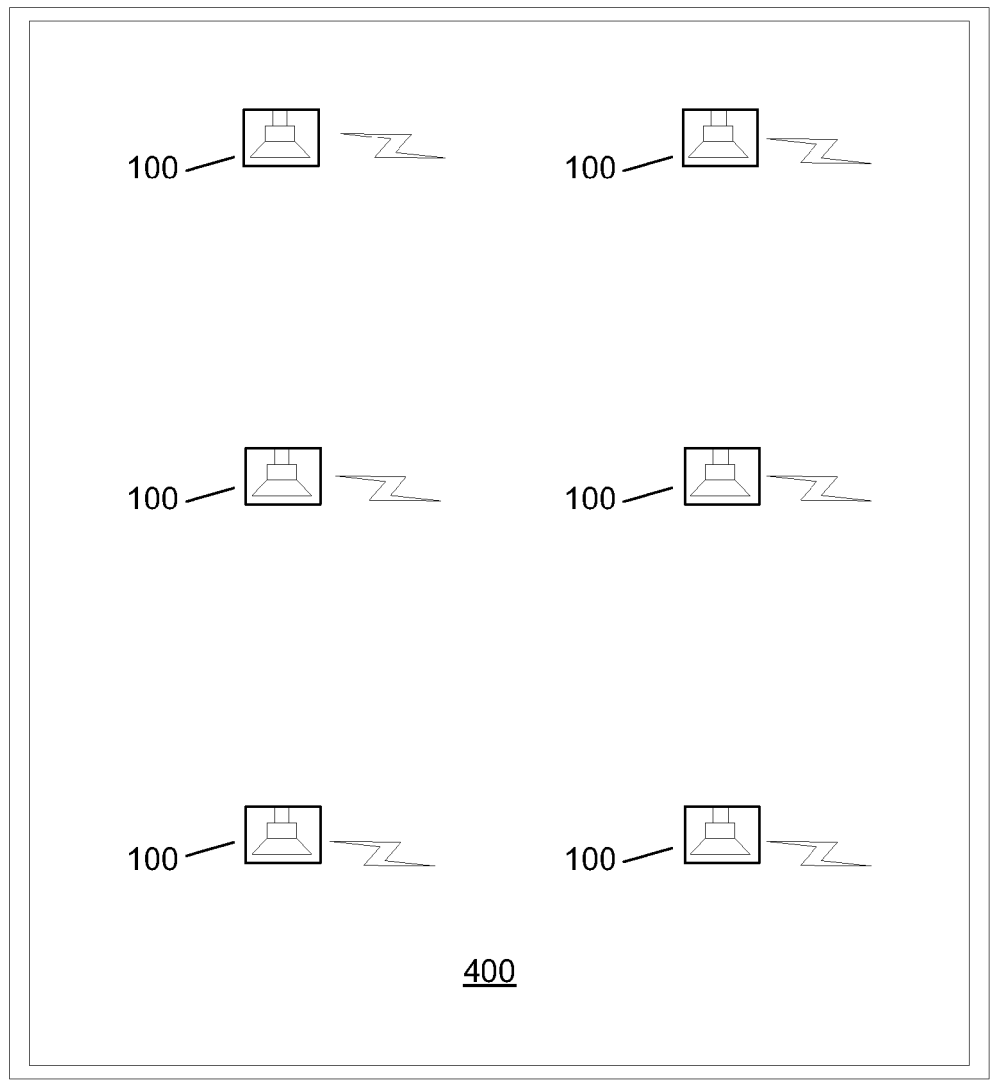
FIG. 4 illustrates a noise masking system in one example.

FIG. 4 illustrates a noise masking system 12 in one example. Noise masking (also referred to as "sound masking") is the introduction of constant background noise in a space in order to reduce speech intelligibility, increase speech privacy, and increase acoustical comfort. For example, a pink noise, filtered pink noise, brown noise, or other similar noise (herein referred to simply as "pink noise") may be injected into the open office. Pink noise is effective in reducing speech intelligibility, increasing speech privacy, and increasing acoustical comfort.

Noise masking system 12 includes a plurality of loudspeakers 100 under control of a computing device 402. In one example, computing device 402 is server 16 shown in FIG. 1. In a further example, computing device 402 interfaces with server 16 to receive control signals.

Referring to FIG. 4, placement of a plurality of loudspeakers 100 in a space 400 is shown in one example. For example, space 400 may be a large room of an office building. The system includes a computing device 402 including a processor and a memory storing application program comprising instructions executable by the processor to perform operations as described herein to output noise masking signals. Computing device 402 is capable of electronic communications with each loudspeaker 100 via either a wired or wireless communications link. For example, computing device 402 and loudspeakers 100 are connected via one or more communications networks such as a local area network (LAN) or an Internet Protocol network.

In one example, each loudspeaker 100 is network addressable and has a unique Internet Protocol address for individual control. Loudspeaker 100 includes a processor operably coupled to a network interface, output transducer, memory, amplifier, and power source. Loudspeaker 100 also includes a near-field wireless interface utilized to link with a control device such as computing device 402.

In one example, the network interface is a wireless transceiver and accompanying antenna for communications with a wireless router or access point. For example, the wireless transceiver is a Bluetooth or IEEE 802.11 transceiver. In a further example, the network interface is a wired interface, such as that an Ethernet jack used to connect to computing device 402 over the Internet or a local area network. The processor allows for processing data, including managing noise masking signals over the network interface, and may include a variety of processors (e.g., digital signal processors), with conventional CPUs being applicable. In one example, each loudspeaker 100 may serve as location beacon which may be utilized to determine the proximity of a headset 10 or mobile device 8 to the loudspeaker 100, and in turn, the location of headset 10 or mobile device 8.

In the system illustrated in FIG. 4, sound is output from loudspeakers 100 corresponding to a noise masking signal configured to mask open space noise. In one example, the noise masking signal is a random noise such as pink noise. The sound operates to mask open space noise heard by a person in open space 400. In one example, the masking levels are advantageously dynamically adjusted in response to the noise level measurements. In one example, masking levels are adjusted on a speaker-by-speaker basis in order to address location-specific noise levels.

In response to headset speech level reporting, noise masking system 12 makes changes to the physical environment, including (1) increasing or reducing the volume of the sound masking in order to maintain an optimal masking level, even as speech noise levels change, (2) modifying the masking sound source—for example, from a filtered pink noise to the sound of running water, (3) modifying the masking sound spectrum—for example, from a filtered pink noise to a noise that is closer to brown noise—in response to volume or noise density information, or (4) increasing or decreasing the lighting level, or to changing the color of ambient lighting in open space 400.

Figure 5:
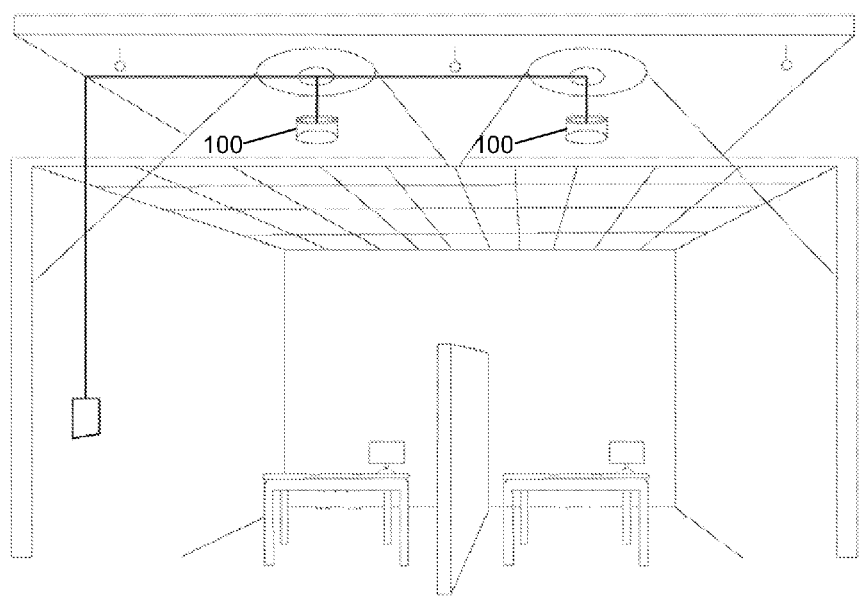
FIG. 5 illustrates placement of the speakers in a noise masking system in one example.

Sound masking systems may be: (1) in-plenum and (2) direct field. FIG. 5 illustrates placement of the loudspeakers 100 shown in FIG. 4 in one example. In-plenum systems involve speakers installed above the ceiling tiles and below the ceiling deck. The speakers are generally oriented upwards, so that the masking sound reflects off of the ceiling deck, becoming diffuse. This makes it more difficult for workers to identify the source of the masking sound and thereby makes the sound less noticeable. In one example, each speaker 100 is one of a plurality of loudspeakers which are disposed in a plenum above the open space and arranged to direct the speaker sound in a direction opposite the open space. In a further example, a "Direct field" system is used, whereby the masking sound travels directly from the speakers to a listener without interacting with any reflecting or transmitting feature.

Figure 6:
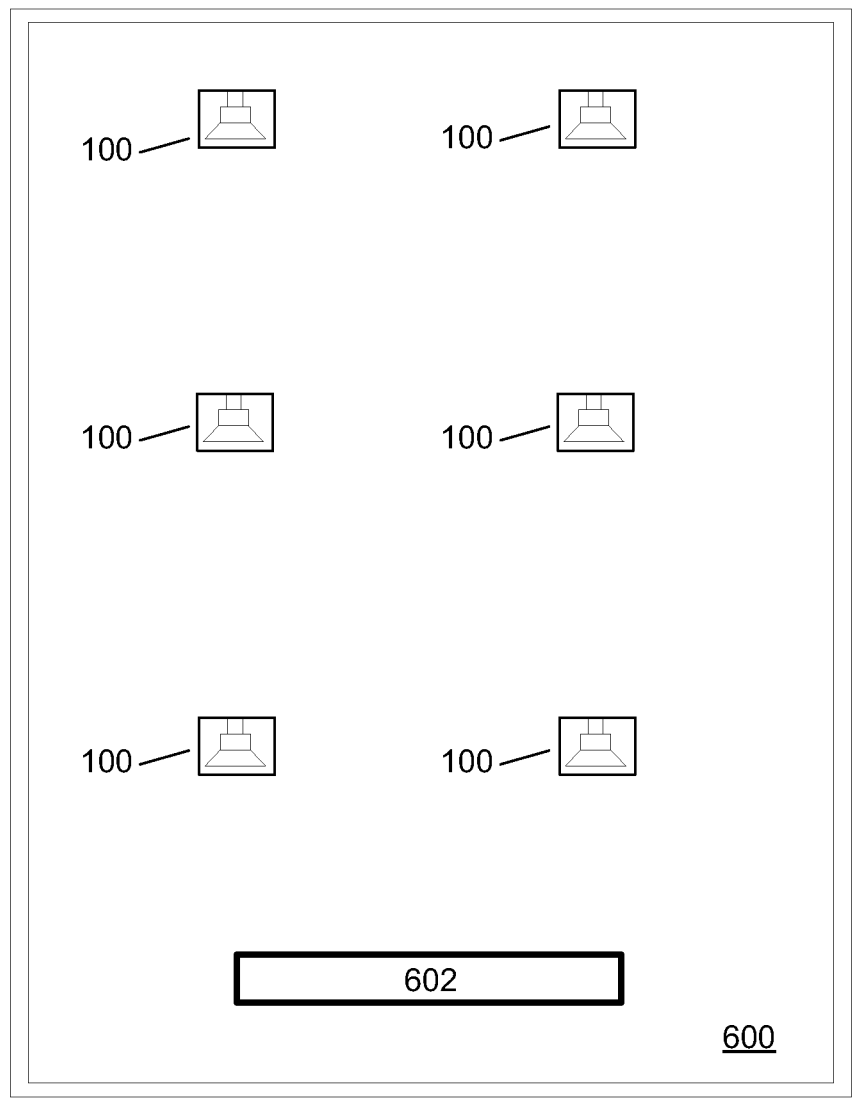
FIG. 6 illustrates a noise masking system in a further example.
Figure 10:
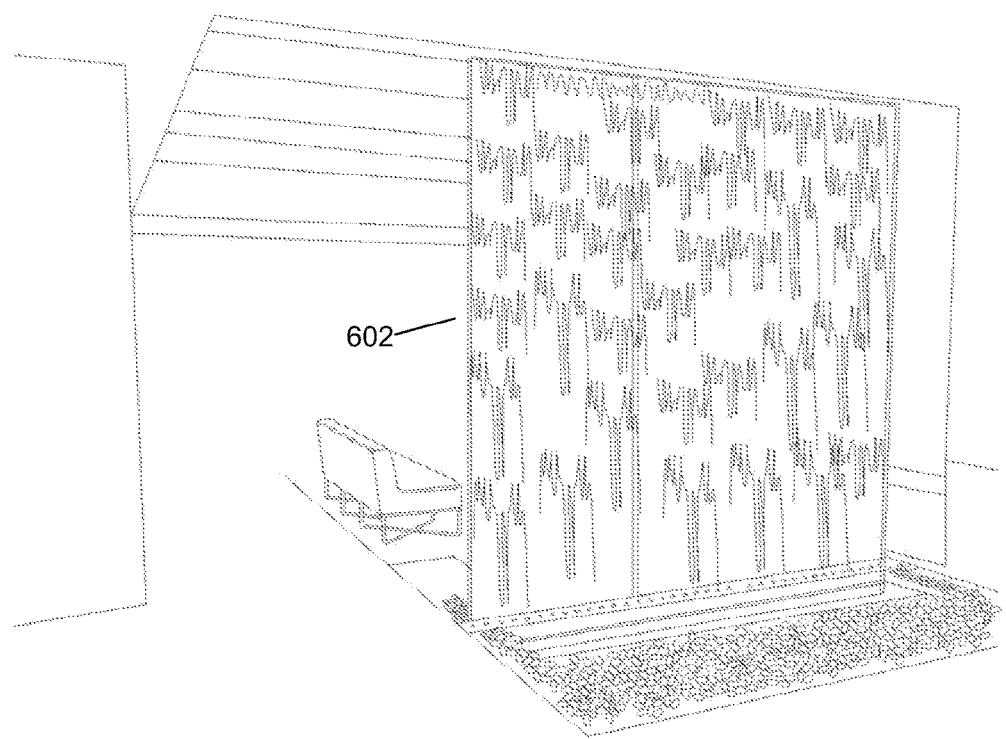
FIG. 10 illustrates the water element system shown in FIG. 6 in one example.

FIG. 6 illustrates a noise masking system 12 in a further example. In this example, noise masking system includes a plurality of loudspeakers 100 and a water element system 602. FIG. 6 illustrates placement of the loudspeakers 100 and the water element system 602 in an open space 600 in one example. For example, open space 600 may be a large room of an office building in which employee cubicles are placed. The water element system 602 is arranged to be easily visible within the open space. In one example, the water element system 602 is a floor-to-ceiling waterfall including an upper reservoir which receives water from a water supply, and a lower reservoir (e.g., a floor basin) to receive water which has fallen from the upper reservoir. The waterfall includes water recirculation tubes for recirculating water from the lower reservoir back to the upper reservoir, and a recirculation pump to recirculate the water through the recirculation tubes up to the upper reservoir. In one implementation, water falls from upper reservoir to the lower reservoir along the surfaces of one or more vertical glass panels disposed between the upper reservoir and the lower reservoir. FIG. 10 illustrates the water element system 602 shown in FIG. 6 in one example.

In one example, the speaker 100 is one of a plurality of loudspeakers which are disposed in a plenum above the open space and arranged to direct the speaker sound in a direction opposite the open space. FIG. 5 illustrates placement of the speaker 100 shown in FIG. 6 in one example. The speaker sound is then reflected by the open space ceiling down into the open space. The speaker sound is the sound of a flow of water. In one example, the sound corresponding to the flow of water is a recording of a natural flow of water or an electronically synthesized sound of flow of water. In one example, the sound corresponding to a flow of water has been optimized to mask open space noise. For example, a recording of the flow of water used to generate sound 4 has been processed to add 2-4 dB per octave higher frequency boost.

In one example, the loudspeaker 100 is one of a plurality of speakers disposed at varying distances from the water element system 602, where an output level of the speaker sound from a speaker is adjusted based on the distance of the loudspeaker 100 from the water element system 602. The speaker output level is adjusted so that the sound level of the flowing water (the sound from the water element system 602 combined with the sound of flowing water output from speaker 100) is consistent throughout the open space. At locations in close proximity to water element system 602, water sound from the water element system 602 is heard. As such, the output level of a speaker 100 in close proximity to water element system 602 is reduced relative to a speaker 100 further away. In one example, sound from the loudspeakers 100 have been processed to match the frequency characteristics of water sound emanating from water element system 602 so that the user is under the impression that speaker sound is emanating from water element system 602 instead of speaker 100.

In this manner, the water element system 602 may be constructed so that it need not be so loud so as to be heard throughout the open space in order for the water sound to be an effective noise masker. This reduces the possibility that workers in close proximity to the water element system 602 will find the water sound too loud and annoying while allowing workers further away to hear water sound at a sufficient level to provide effective masking of the open space noise. Further description of the noise masking system shown in FIG. 6 can be found in commonly assigned and co-pending U.S. patent application Ser. No. 14/136,372 entitled "Masking Open Space Noise Using Sound and Corresponding Visual", which was filed Dec. 20, 2013, and which is hereby incorporated into this disclosure by reference for all purposes. In response to headset speech level reporting, noise masking system 12 makes changes to the physical environment, including modifying the flow rate of water element system 602 and/or the output level of the water sound from loudspeakers 100.

Figure 7:
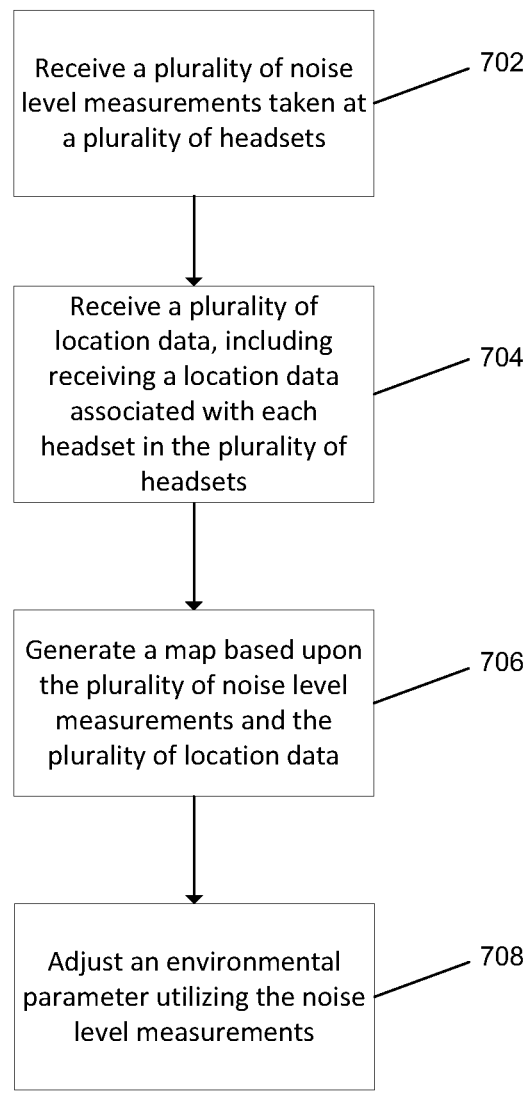
FIG. 7 is a flow diagram illustrating adjusting an environmental parameter utilizing noise level measurements in one example.

FIG. 7 is a flow diagram illustrating adjusting an environmental parameter utilizing noise level measurements in one example. For example, the process illustrated may be implemented by the system shown in FIG. 1.

At block 702, a plurality of noise level measurements taken at a plurality of headsets are received. In one example, the noise level measurement is a headset wearer speech level during a telephone call. In one example, the process further includes detecting a headset worn state of a headset, measuring a noise level at a headset microphone of the headset, and transmitting the noise level measurement from the headset to a remote computing device.

At block 704, a plurality of location data is received. In one example, a unique identifier associated with each noise level measurement and each location data is received. At block 706, a map is generated based upon the plurality of noise level measurements and the plurality of location data.

At block 708, an environmental parameter is adjusted utilizing the noise level measurements. In one example, adjusting the environmental parameter utilizing the noise level measurements includes adjusting a sound masking volume level. In one example, adjusting an environmental parameter utilizing the noise level measurements includes adjusting a sound masking sound type from a first masking sound type to a second masking sound type. In one example, adjusting an environmental parameter utilizing the noise level measurements includes adjusting a lighting level or a lighting color.

In one example, a geographical area having a higher noise level and a geographical area having a lower noise level is identified. Location services are provided to a user directing the user to the geographical area having a higher noise level or the geographical area having a lower noise level.

Figure 8:
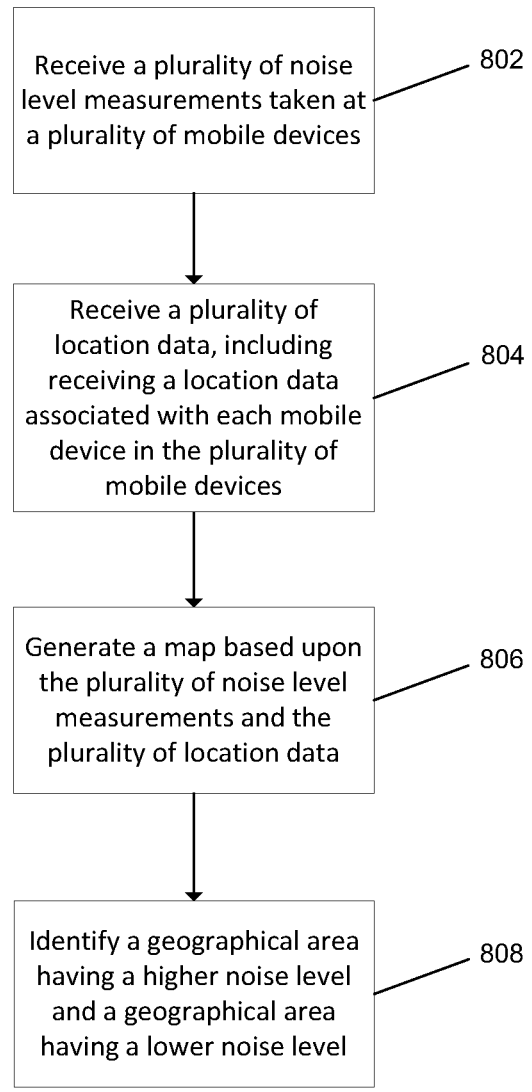
FIG. 8 is a flow diagram illustrating identifying geographical areas having higher noise levels and lower noise levels in one example.

FIG. 8 is a flow diagram illustrating identifying geographical areas having higher noise levels and lower noise levels in one example. For example, the process illustrated may be implemented by the system shown in FIG. 1. At block 802, a plurality of noise level measurements taken at a plurality of mobile devices are received. In one example, the plurality of mobile devices includes a plurality of headsets. The process further includes detecting a headset worn state of a headset, measuring a noise level at a headset microphone of the headset, and transmitting the noise level measurement from the headset to a remote computing device.

At block 804, a plurality of location data is received, including receiving a location data associated with each mobile device in the plurality of mobile devices. In one example, the method further includes receiving a unique identifier associated with each noise level measurement and each location data.

At block 806, a map is generated based upon the plurality of noise level measurements and the plurality of location data. At block 808, a geographical area having a higher noise level is identified and a geographical area having a lower noise level is identified. In one example, the process further includes providing location services to a user directing the user to the geographical area having a higher noise level or the geographical area having a lower noise level.

In one example, the process further includes adjusting an environmental parameter utilizing the noise level measurements. For example, adjusting the environmental parameter utilizing the noise level measurements includes adjusting a sound masking volume level.

Figure 9:
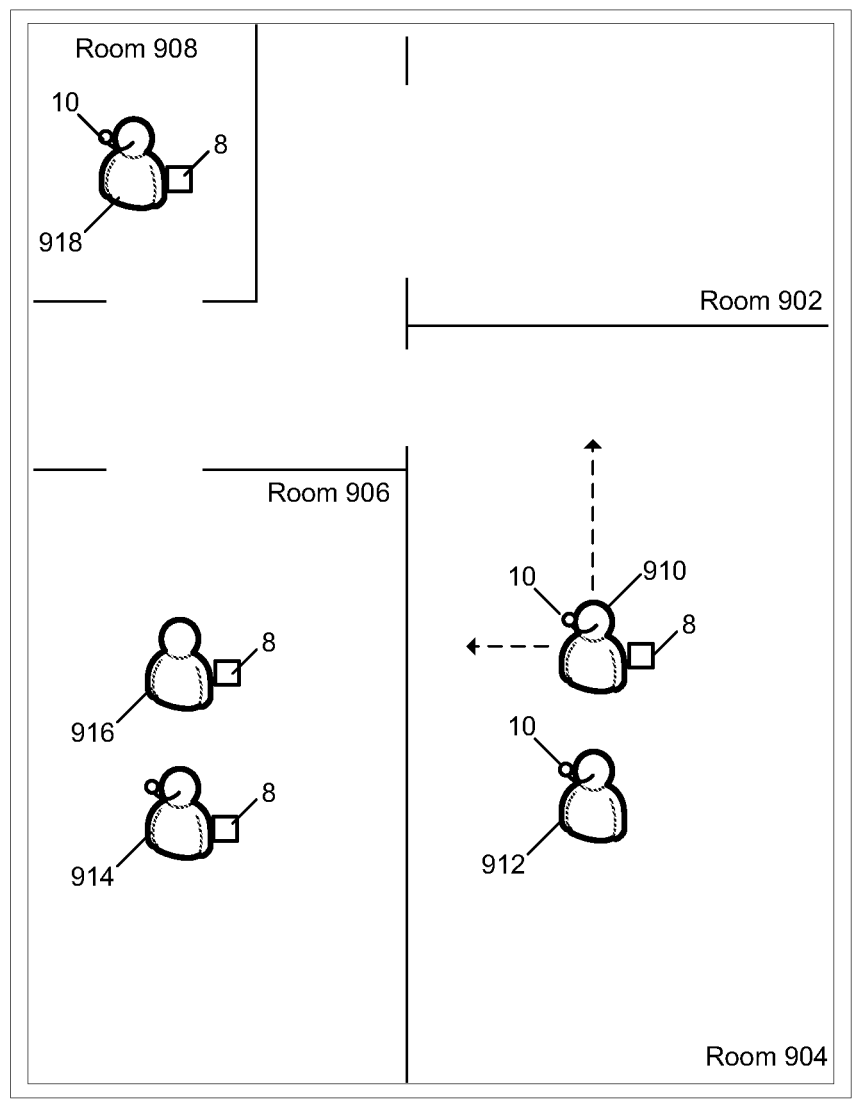
FIG. 9 illustrates providing location services to a user in one example.

FIG. 9 illustrates providing location services to a user 910 in a floor plan 900 based on measured noise levels in one example. Floor plan 900 includes a first room 902, a second room 904, a third room 906, and a fourth room 908. For example, where floor plan 900 corresponds to the workplace of a user 910, first room 902 may be a conference room, room 904 may be an open space area, third room 906 may be a conference room, and fourth room 908 may be a conference room.

In the example illustrated in FIG. 9, mobile devices including mobile devices 8 and headsets 10 are being used by persons 912, 914, 916, and 918 at various locations within floor plan 900 as shown. Utilizing the methods and apparatuses described herein, noise level measurements taken at the mobile devices are received. Location data associated with each mobile device is also received. Geographical areas having a higher noise level are identified and geographical areas having a lower noise level are identified. For example, a server 16 may identify that rooms 904, 906, and 908 have higher noise levels (due to speech by persons 912, 914, 916, and 918) and identify that room 902 has no noise. Location services are provided to the user 910 via a mobile device 8 directing the user 910 to room 902. In one example, as part of the location services, a map of floor plan 900 may be generated and provided to user 910 based on the noise level measurements and the location data. The user may be directed to a more specific location, such as a particular area in a room, a particular workstation, and so on.

While the exemplary embodiments of the present invention are described and illustrated herein, it will be appreciated that they are merely illustrative and that modifications can be made to these embodiments without departing from the spirit and scope of the invention. Certain examples described utilize headsets which are particularly advantageous for the reasons described herein. In further examples, other devices, such as other body worn devices may be used in place of headsets, including wrist-worn devices. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Terms such as "component", "module", "circuit", and "system" are intended to encompass software, hardware, or a combination of software and hardware. For example, a system or component may be a process, a process executing on a processor, or a processor. Furthermore, a functionality, component or system may be localized on a single device or distributed across several devices. The described subject matter may be implemented as an apparatus, a method, or article of manufacture using standard programming or engineering techniques to produce software, firmware, hardware, or any combination thereof to control one or more computing devices.

Thus, the scope of the invention is intended to be defined only in terms of the following claims as may be amended, with each claim being expressly incorporated into this Description of Specific Embodiments as an embodiment of the invention.

What is claimed is:

1. A method comprising:
   receiving over an electronic communications link a plurality of noise level measurements taken with a plurality of microphones at a plurality of mobile devices located within a same building space;
   receiving a plurality of location data, comprising receiving a location data associated with each mobile device in the plurality of mobile devices located within the same building space;
   generating a map with a computing device, the map based upon the plurality of noise level measurements and the plurality of location data;
   identifying a geographical area within the same building space having a higher noise level and a geographical area within the same building space having a lower noise level;
   providing location services to a user directing the user to the geographical area within the same building space having the higher noise level or the geographical area within the same building space having the lower noise level; and
   electronically adjusting an output of a sound masking noise utilizing the plurality of noise level measurements.

2. The method of claim 1, wherein at least one mobile device in the plurality of mobile devices is a headset, and wherein at least one noise level measurement in the plurality of noise level measurements is a headset wearer speech level during a telephone call.

3. The method of claim 1, further comprising receiving a unique identifier associated with each noise level measurement and each location data.

4. The method of claim 1, wherein at least one mobile device in the plurality of mobile devices comprises a headset, the method further comprising:
   detecting a headset worn state of the headset;
   measuring a noise level at a headset microphone of the headset; and
   transmitting the noise level from the headset to a remote computing device.

5. The method of claim 1, wherein adjusting the output of the sound masking noise utilizing the plurality of noise level measurements comprises: adjusting a sound masking volume level.

6. The method of claim 1, wherein adjusting the output of the sound masking noise utilizing the plurality of noise level measurements comprises: adjusting a sound masking sound type from a first masking sound type to a second masking sound type.

7. The method of claim 1, further comprising adjusting a lighting level or a lighting color in the same building space.

8. A method comprising:
   receiving over an electronic communications link a plurality of noise level measurements taken at a plurality of mobile devices located within a same building space;
   receiving at a computing device a plurality of location data, comprising receiving a location data associated with each mobile device in the plurality of mobile devices located within the same building space;
   identifying with the computing device a geographical area within the same building space having a higher noise level and a geographical area within the same building space having a lower noise level;
   providing location services to a user directing the user to the geographical area within the same building space having the higher noise level or the geographical area within the same building space having the lower noise level; and
   electronically adjusting an output of a sound masking noise utilizing the plurality of noise level measurements.

9. The method of claim 8, wherein the plurality of mobile devices comprise a plurality of headsets.

10. The method of claim 8, further comprising generating a map based upon the plurality of noise level measurements and the plurality of location data.

11. The method of claim 8, further comprising receiving a unique identifier associated with each noise level measurement and each location data.

12. The method of claim 8, wherein the plurality of mobile devices comprise a plurality of headsets, the method further comprising:
    detecting a headset worn state of a headset;
    measuring a noise level at a headset microphone of the headset; and
    transmitting the noise level from the headset to a remote computing device.

13. The method of claim 8, wherein adjusting the output of the sound masking noise utilizing the plurality of noise level measurements comprises: adjusting a sound masking volume level.

14. A system comprising:
    a plurality of mobile devices located within a same building space;
    a noise masking system; and
    a computing device comprising:
    a processor;
    a memory storing an application program executable by the processor, the application program comprising instructions to receive noise level measurements taken at the plurality of mobile devices located within the same building space, adjust a sound masking volume level of a sound masking noise output from the noise masking system, and provide location services to a user directing the user to a geographical area having a higher noise level or a geographical area having a lower noise level.

15. The system of claim 14, wherein the application program comprises further instructions to adjust a sound masking sound type output from the noise masking system from a first masking sound type to a second masking sound type.

16. The system of claim 14, wherein the application program comprises further instructions to receive from the plurality of mobile devices a location data associated with each mobile device in the plurality of mobile devices.

17. The system of claim 16, wherein the application program comprises further instructions to generate a map based upon the noise level measurements and the location data associated with the plurality of mobile devices.

\* \* \* \* \*